(12) United States Patent
Kupinsky et al.

(10) Patent No.: US 8,996,670 B2
(45) Date of Patent: Mar. 31, 2015

(54) METHODS, SYSTEMS, AND COMPUTER READABLE MEDIA FOR NETWORK METADATA BASED POLICY CONTROL

(75) Inventors: Stuart H. Kupinsky, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/402,756

(22) Filed: Feb. 22, 2012

(65) Prior Publication Data

US 2013/0036215 A1    Feb. 7, 2013

Related U.S. Application Data

(60) Provisional application No. 61/515,484, filed on Aug. 5, 2011.

(51) Int. Cl.
*G06F 15/16* (2006.01)
*H04M 11/00* (2006.01)
*G06F 11/00* (2006.01)
*H04L 12/24* (2006.01)

(52) U.S. Cl.
CPC .................................. *H04L 41/0893* (2013.01)
USPC ............................ 709/223; 455/405; 370/238

(58) Field of Classification Search
USPC ............... 709/217–231; 455/456.1, 405, 406; 370/235–329
See application file for complete search history.

(56) References Cited

U.S. PATENT DOCUMENTS

| | | | |
|---|---|---|---|
| 3,917,915 | A | 11/1975 | Karras |
| 4,162,377 | A | 7/1979 | Mearns |
| 4,191,860 | A | 3/1980 | Weber |

(Continued)

FOREIGN PATENT DOCUMENTS

| | | |
|---|---|---|
| EP | 0 088 639 | 9/1983 |
| EP | 0 212 654 | 5/1987 |

(Continued)

OTHER PUBLICATIONS

Notification of Transmittal of the International Search Report and the Written Opinion of the International Searching Authority, or the Declaration for International Application No. International PCT/US2012/026178 (Jul. 30, 2012).

(Continued)

*Primary Examiner* — Yasin Barqadle
(74) *Attorney, Agent, or Firm* — Jenkins, Wilson, Taylor & Hunt, P.A.

(57) ABSTRACT

The subject matter described herein includes methods, systems, and computer readable media for network metadata based policy control. According to one aspect, a system for network metadata based policy control is provided. The system includes a network metadata directed policy server for obtaining network information for a plurality of subscribers, for deriving network metadata from the network information, for applying a network metadata policy manipulation rule for changing a value of a network an operator assigned policy control parameter for the subscribers, and for generating an instruction for changing the value of the network operator assigned policy control parameter for the subscriber. The system further includes a policy control and charging rules function (PCRF) node for detecting the instruction and for instructing a policy and charging enforcement function (PCEF) node to change value of the operator assigned policy control parameter for the subscribers.

30 Claims, 6 Drawing Sheets

(56) References Cited

U.S. PATENT DOCUMENTS

| | | |
|---|---|---|
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Brouckman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 7,058,036 B1 | 6/2006 | Yu et al. |
| 7,738,891 B2 | 6/2010 | Tenhunen et al. |
| 8,305,922 B2 | 11/2012 | Cuervo |
| 8,331,229 B1 | 12/2012 | Hu et al. |
| 8,620,263 B2 | 12/2013 | Ravishankar et al. |
| 8,681,622 B2 | 3/2014 | Chatterjee et al. |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0058507 A1 | 5/2002 | Valentine et al. |
| 2002/0111153 A1 | 8/2002 | Hartmaier et al. |
| 2002/0150079 A1 | 10/2002 | Zabawskyj et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0153506 A1 | 8/2004 | Ito et al. |
| 2004/0166878 A1 | 8/2004 | Erskine et al. |
| 2004/0213393 A1 | 10/2004 | Bedingfield et al. |
| 2004/0233840 A1 | 11/2004 | Bye |
| 2004/0240638 A1 | 12/2004 | Donovan |
| 2005/0027867 A1 | 2/2005 | Mueller et al. |
| 2005/0070310 A1 | 3/2005 | Caspi et al. |
| 2005/0202836 A1 | 9/2005 | Schaedler et al. |
| 2006/0053197 A1 | 3/2006 | Yoshimura et al. |
| 2006/0291488 A1 | 12/2006 | Naqvi et al. |
| 2007/0185809 A1 | 8/2007 | Duan |
| 2009/0172782 A1 | 7/2009 | Taglienti et al. |
| 2009/0207730 A1 | 8/2009 | Stamoulis et al. |
| 2009/0225719 A1 | 9/2009 | Zhi et al. |
| 2009/0245108 A1 | 10/2009 | Wu et al. |

(56) References Cited

U.S. PATENT DOCUMENTS

| | | | |
|---|---|---|---|
| 2009/0327112 | A1 | 12/2009 | Li et al. |
| 2010/0137002 | A1* | 6/2010 | Agarwal et al. ............ 455/456.1 |
| 2010/0161802 | A1 | 6/2010 | Tofighbakhsh et al. |
| 2010/0184403 | A1 | 7/2010 | Cai et al. |
| 2010/0287121 | A1 | 11/2010 | Li et al. |
| 2011/0003579 | A1 | 1/2011 | Cai et al. |
| 2011/0158090 | A1 | 6/2011 | Riley et al. |
| 2011/0170411 | A1 | 7/2011 | Wang et al. |
| 2011/0170412 | A1* | 7/2011 | Ramadas et al. .............. 370/235 |
| 2011/0217979 | A1 | 9/2011 | Nas |
| 2011/0231540 | A1* | 9/2011 | Tai et al. ....................... 709/223 |
| 2011/0246586 | A1 | 10/2011 | Steele |
| 2011/0307790 | A1* | 12/2011 | Pandya et al. ................. 715/735 |
| 2011/0317557 | A1 | 12/2011 | Siddam et al. |
| 2012/0026947 | A1 | 2/2012 | Miller et al. |
| 2012/0034900 | A1 | 2/2012 | Agarwal |
| 2012/0052866 | A1 | 3/2012 | Froehlich et al. |
| 2012/0059943 | A1 | 3/2012 | Castro Castro et al. |
| 2012/0064878 | A1* | 3/2012 | Castro Castro et al. ...... 455/418 |
| 2012/0084371 | A1 | 4/2012 | Rajagopalan et al. |
| 2012/0094685 | A1 | 4/2012 | Marsico |
| 2012/0096139 | A1* | 4/2012 | Cackowski et al. ........... 709/223 |
| 2012/0099715 | A1* | 4/2012 | Ravishankar et al. ... 379/114.01 |
| 2012/0100849 | A1 | 4/2012 | Marsico |
| 2012/0129488 | A1 | 5/2012 | Patterson et al. |
| 2012/0140632 | A1 | 6/2012 | Norp et al. |
| 2012/0163297 | A1 | 6/2012 | Agarwal et al. |
| 2012/0176894 | A1 | 7/2012 | Cai et al. |
| 2012/0220330 | A1* | 8/2012 | Goldner et al. ............... 455/517 |
| 2012/0233325 | A1 | 9/2012 | Zhou et al. |
| 2012/0257499 | A1* | 10/2012 | Chatterjee et al. ............ 370/232 |
| 2013/0017803 | A1 | 1/2013 | Li et al. |

FOREIGN PATENT DOCUMENTS

| | | |
|---|---|---|
| EP | 0 258 654 | 3/1988 |
| EP | 0 264 023 | 4/1988 |
| EP | 1 100 279 A2 | 5/2001 |
| GB | 2 382 267 | 5/2003 |
| JP | 58-215164 | 12/1983 |
| JP | 62-200859 | 9/1987 |
| KR | 1020030025024 A | 3/2003 |
| WO | WO 84/01073 | 3/1984 |
| WO | WO 88/00419 | 1/1988 |
| WO | WO 86/03915 | 7/1988 |
| WO | WO 97/33441 | 9/1997 |
| WO | WO 99/14910 | 3/1999 |
| WO | WO 00/16583 | 3/2000 |
| WO | WO 00/35155 A1 | 6/2000 |
| WO | WO 01/20920 A1 | 3/2001 |
| WO | WO 01/56308 A2 | 8/2001 |
| WO | WO 2006/031678 A2 | 3/2006 |
| WO | WO 2012/021344 A2 | 2/2012 |

OTHER PUBLICATIONS

"About 3GPP: What is the difference between a SIM and a USIM? What is a UICC?," About http://www.3gpp.org/FAQ#outil_sommaire_58, pp. 1-11 (Copyright 2012).

"Smart Cards; Card Application Toolkit (CAT) (Release 10)," ETSI TS 102 223 V10.5.0, pp. 1-224 (Sep. 2011).

"3rd Generation Partnership Project; Technical Specification Group Services and System Aspects; Universal Geographical Area Description (GAD) (Release 10)," 3GPP TS 23.032, pp. 1-29 (Mar. 2011).

"3rd Generation Partnership Project; Technical Specification Group Core Network and Terminals; Policy and Charging Control over Rx reference point (Release 9)," 3GPP TS 29.214 V9.3.0 pp. 1-44 (Mar. 2010).

"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).

Notice of Allowance and Fee(s) Due for U.S. Appl. No. 13/277,626 (Aug. 20, 2013).

Non-Final Office Action for U.S. Appl. No. 13/274,936 (May 1, 2013).

Non-Final Office Action for U.S. Appl. No. 13/277,626 (Feb. 27, 2013).

"3rd Generation Partnership Project; Technical Specification Group Services and Systems Aspects; Telecommunication management; Charging management; Diameter charging applications (Release 9)," 3GPP TS 32.299 V9.4.0, pp. 1-148 (Jun. 2010).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

"BICC Architecture and BICC Protocol Details," Tekelec, p. 28-41 (2008).

"BICC Signaling Router (BSR) Reference Architecture (WP005274)," Tekelec, p. 2-91 (2008).

Jennings et al., "Session Initiation Protocol (SIP) URIs for Application such as Voicemail and Interactive Voice Reponse (IVR)," The Internet Society, RFC 4458 (Apr. 2006).

"Interworking Between Session Initiation Protocol (SIP) and Bearer Independent Call Control Protocol or ISDN User Part," ITU-T Q.1912.5, p. 1-101 (Mar. 2004).

"Prepaid vs. Number Portability," Power Point presentation (publication date unknown; electronic file creation date Jul. 29, 2003.).

"Bearer Independent Call Bearer Control Protocol," ITU-T Q.1950, p. 1-96 (Dec. 2002).

Chang, "BICC Extension of SIP in Inter-Network Configuration," Internet Engineering Task Force, draft-chang-sipping-bicc-network-00.txt, pp. 1-17 (Mar. 2002).

Marshall et al., "SIP Extensions for Supporting Distributed Call State," SIP Working Group, Internet Draft, pp. 1-12 (Aug. 2001).

"Bearer Independent Call Control Protocol (Capability Set 2) and Signalling System No. 7 ISDN User Part: Formats and Codes," ITU-T Q.1902.3, p. 1-141 (Jul. 2001).

"Bearer Independent Call Control Protocol (Capability Set 2) and Signaling System No. 7 ISDN user part: General Functions of Messages and Parameters," ITU-T Q.1902.2 (July 2001).

"Bearer Independent Call Control Protocol (Capability Set 2): Functional Description," ITU-T Q.1902.1, p. 1-23 (Jul. 2001).

"Bearer Independent Call Control Protocol," ITU-T Q.1901 (Jun. 2000).

Sugano et al., "Presence Information Data Format for IMPP," Internet draft, draft-ietf-impp-pidf-01.text, Network Working Group, pp. 1-17 (Mar. 10, 2000).

Liao et al., "SS7-TCAP/IP Interworking," Internet Engineering Task Force, pp. 1-14 (Mar. 1999).

De Ment, "The Evolution of Signaling," NMS Communications, p. 1-28 (Publication Date Unknown).

"Mobile Wireless Overview," Cisco IOS Mobile Wireless Configuration Guide, pp. MWC-1-MWC-8 (Publication Date Unknown).

Final Office Action for U.S. Appl. No. 13/274,936 (Nov. 15, 2013).

Notice of Allowance and Fee(s) Due for U.S. Appl. 13/330,086 (Nov. 6, 2013).

Email to U.S. Patent and Trademark Office dated Jun. 28, 2013.

Notice of Allowance and Fee(s) Due for U.S. Appl. No. 13/244,237 (Oct. 16, 2014).

Non-Final Office Action for U.S. Appl. No. 13/274,936 (Aug. 28, 2014)

Final Office Action for U.S. Appl. No. 13/244,337 (Aug 6, 2014).

Non-Final Office Action for U.S. Appl. No. 13/244,237 (Apr. 3, 2014).

Advisory Action Before the Filing of an Appeal Brief for U.S. Appl. No. 13/274,936 (Feb. 3, 2014).

* cited by examiner

METHODS, SYSTEMS, AND COMPUTER READABLE MEDIA FOR NETWORK METADATA BASED POLICY CONTROL

PRIORITY CLAIM

This application claims the benefit of U.S. provisional patent application Ser. No. 61/515,484, filed Aug. 5, 2011.

TECHNICAL FIELD

The subject matter described herein relates to network policy control. More particularly, the subject matter described herein relates to methods, systems, and computer readable media for network metadata based policy control.

BACKGROUND

In long term evolution (LTE) networks, the policy and charging rules function (PCRF) is the network entity that implements policy control decision flow and charging functionality. A separate entity, the policy and charging enforcement function (PCEF), implements policies in accordance with instructions from the PCRF. The interface between the PCRF and the PCEF is referred to as the Gx interface. The PCEF is typically co-located with a service node, such as a gateway GPRS support node (GGSN).

In LTE networks, the PCRF typically implements operator defined policy rules for each subscriber. For example, a subscriber may contract with the network operator for a particular amount of network bandwidth across all applications, and the operator may define rules that are used by the PCRF to instruct the PCEF to enforce those rules. When a subscriber seeks to access a network service, such as a video download service to the subscriber's mobile phone, a node referred to as an application function (AF), which provides the video download service, contacts the PCRF to request a particular amount of bandwidth for the video download. The PCRF evaluates the request to determine whether the requested bandwidth is within the contract limit for the subscriber. If the requested bandwidth is within the contract limit, the PCRF instructs the PCEF to allocate the requested bandwidth.

In some instances, it may be desirable to implement agreements between network operators and third parties, such as retailers, to provide enhanced services to subscribers, for example, when the subscribers visit a particular retailer or other entity. There is not believed to be a mechanism defined in current LTE network standards for implementing such agreements.

It may also be desirable to allow network operators to automatically provide enhancements to subscribers based on group subscriber behavior. For example, a retailer or other entity may be willing to enter an agreement with a network operator if the network operator provides incentives when groups of subscribers are present in the retailer's location.

Accordingly, there exists a need for methods, systems, and computer readable media for network metadata based policy control.

SUMMARY

The subject matter described herein includes methods, systems, and computer readable media for network metadata based policy control. According to one aspect, a system for network metadata based policy control is provided. The system includes a network metadata directed policy server for obtaining network information for a plurality of subscribers, for deriving network metadata from the network information, for applying a network metadata policy manipulation rule for changing a value of an operator assigned policy control parameter for the subscribers, and for sending an instruction for changing the value of the network operator assigned policy control parameter for the subscriber. The system further includes a policy and charging rules function (PCRF) node for receiving the instruction and for instructing a policy and charging enforcement function (PCEF) node to change the value of the operator assigned policy control parameter for the subscribers.

The subject matter described herein for network metadata based policy control can be implemented using a non-transitory computer readable medium having stored thereon executable instructions that when executed by the processor of a computer control the computer to perform steps. Exemplary computer readable media suitable for implementing the subject matter described herein include disk memory devices, chip memory devices, application specific integrated circuits, and programmable logic devices. In addition, a computer readable medium that implements the subject matter described herein may be located on a single device or computing platform or may be distributed across multiple devices or computing platforms.

In addition, the term "node" as used herein refers to a physical computing platform that implements all or a portion of the functionality described herein for network metadata based policy control. For example, a network node may include one or more microprocessors, memory, and network interfaces.

BRIEF DESCRIPTION OF THE DRAWINGS

Preferred embodiments of the subject matter described herein will now be explained with reference to the accompanying drawings of which.

DETAILED DESCRIPTION

The subject matter described herein includes methods, systems, and computer readable media for network metadata based policy control. For example, it may be desirable for a network operator, such as XYZ Wireless Company, to implement an agreement with a retailer, such as Joe's Java, such that when a certain number of the network operator's subscribers are within the retailer's location or locations, the values of the operator assigned policy control parameters for the subscribers will be temporarily enhanced. For example, if the network operator's subscribers each typically receive a maximum download speed of one megabyte per second, that speed may be increased by 20% for 15 minutes if a certain number of those subscribers visit the retailer's location or locations. The network operator thus provides an incentive for its subscribers to visit the retailer. In return for the incentive and the execution of the policy rule, the retailer may compensate the network operator.

In one embodiment, a network metadata directed policy server may collect network information regarding a plurality of subscribers and may derive network metadata from the received network information. For example, the network information may indicate locations of the operator's subscribers, and network metadata may include the number of the operator's subscribers currently visiting the retailer in one location or across plural business locations of the retailer. The network metadata directed policy server may then apply the rule to determine whether a threshold number of the subscribers are within the retailer's location or locations. The network metadata directed policy server may then instruct the PCRF to enhance the quality of service for the subscribers within the retailer's location or locations for a predetermined time period or until instructed to stop enhancing the quality of service. The PCRF may in turn instruct the PCEF to implement the policy that enhances the quality of service for the subscribers of the network operator that are in the particular retailer location or locations. In one embodiment, once the action specified by the policy is triggered, the PCRF or the network metadata directed policy server may generate a billing record for the enhancement of the QoS for the group of subscribers and use that record to collect revenue from the retailer as part of a previously negotiated business agreement between the network operator and the retailer.

Figure 1:
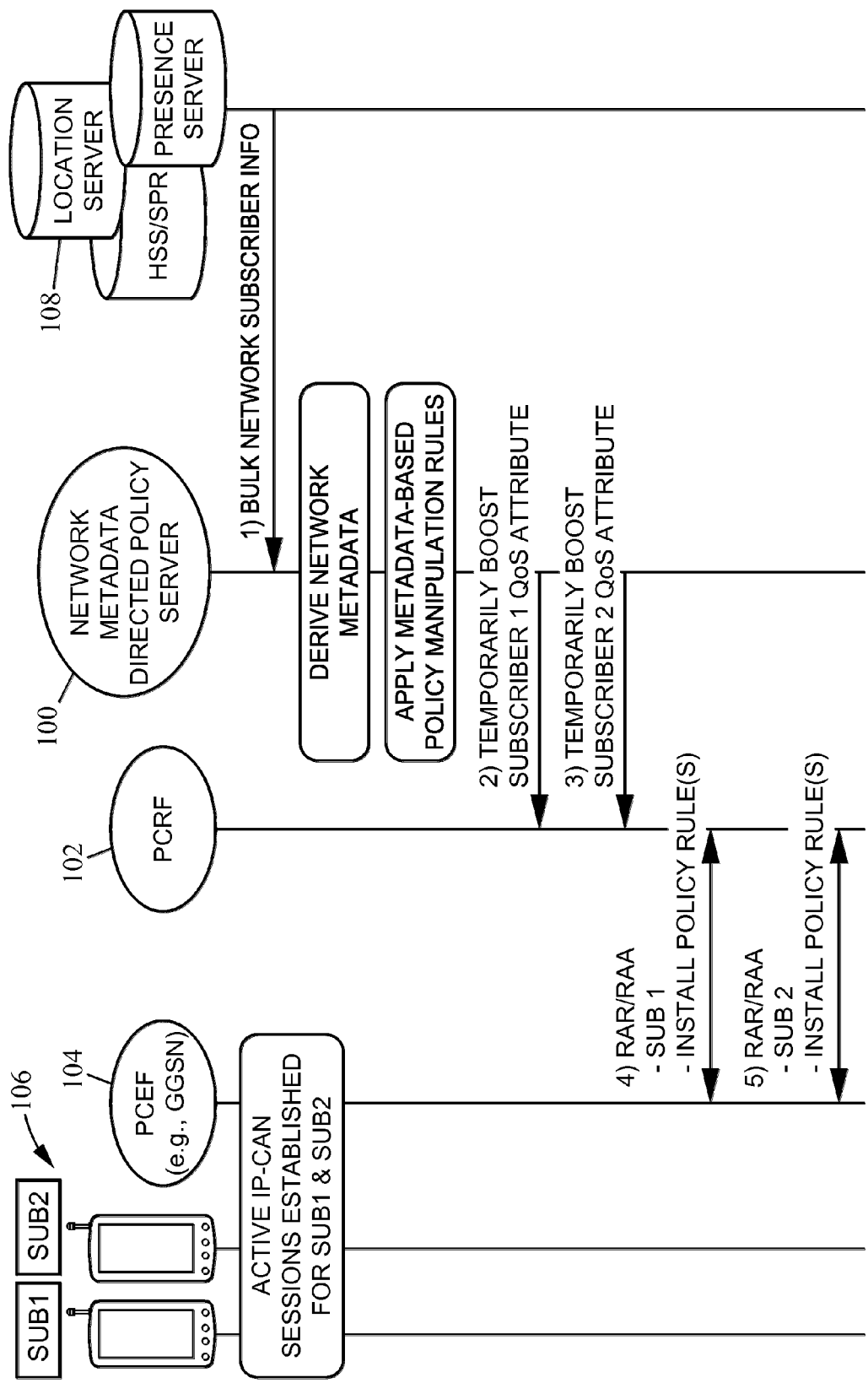
FIG. 1 is a message flow diagram illustrating exemplary messaging for implementing network metadata based policy control according to an embodiment of the subject matter described herein.

FIG. 1 is a message flow diagram illustrating exemplary messaging for implementing network metadata based policy control according to an embodiment of the subject matter described herein. Referring to FIG. 1, a network metadata directed policy server 100 may implement network metadata directed policy control rules. A PCRF 102 may implement policy control rules defined by the network operator for its subscribers. A PCEF 104 enforces policy control rules under the direction of PCRF 102. Mobile subscriber devices 106 may be any suitable mobile communications devices, such as mobile handsets, through which subscribers seek to access network services. Network information sources 108 may include home subscriber servers (HSSs), home location registers (HLRs), location servers, presence servers, or other suitable source of subscriber information.

In operation, network metadata directed policy server 100 implements the above-described network metadata based policy control rules, such as determining whether a certain number of a particular network operator's subscribers are within a particular retailer's location or locations and increasing data download bandwidth for the network operator's subscribers in the retailer's location or locations if the threshold requirement is met. Network metadata directed policy server 100 may communicate with PCRF 102 to temporarily increase or enhance QoS for the subscribers. PCRF 102 communicates with PCEF 104 to instruct PCEF 104 to implement the action specified by the policy control rule for subscriber devices 106.

Although in FIG. 1, network metadata directed policy server 100 and PCRF 102 are shown as separate nodes, network metadata directed policy server 100 and PCRF 102 may be co-located with each other. For example, the functionality of network metadata directed policy server 100 may be implemented by PCRF 102 without departing from the scope of the subject matter described herein.

In the above-described examples, network information sources include core network nodes, such as HLRs and HSSs. In an alternate example, network information sources 108 may also include mobile subscriber devices 106. For instance, proactive universal integrated circuit card (UICC) is a procedure where the UICC within a phone can issue a geographic location request to the phone to obtain the geographic position of the phone. The UICC can then be queried, for example, by PCEF 104, to provide the geographic position of the phone. PCEF 104 may provide the geographic position information to PCRF 102 and/or network metadata directed policy server 100, which can then use the geographic information to derive the network metadata, such as whether the phone is within the geographic domain of a particular retailer. Each mobile subscriber device 106 may determine its own location through any suitable mechanism, including an internal global positioning system (GPS) chip or through triangulation based on signals detected from different radio towers.

Referring to the message flow in FIG. 1, in message 1, network information sources 108 provide subscriber information for a plurality of subscribers to network metadata directed policy server 100. Network metadata directed policy server 100 derives network metadata, such as the number of a particular network operator's subscribers currently within a particular retailer's location or locations, from the subscriber network information and applies a metadata policy manipulation rule. In one example, the network metadata based policy manipulation rule may include a condition, such as whether the number of subscribers within a retailer's location or locations exceeds a threshold, and an action. The action may be to enhance or manipulate an operator controlled QoS parameter for the subscribers. In messages 2 and 3, network metadata directed policy server 100 instructs PCRF 102 to enhance a QoS attribute for the subscribers. In this example, specific subscribers may be identified in the instructions from network metadata directed policy server 100. The subscribers may be identified by IMSI or other suitable subscriber identifier.

In messages 4 and 5, PCRF 102 signals PCEF 104 over the Gx interface to implement the policy to enhance the QoS attribute for the subscribers. In the illustrated example, the messaging sent over this interface includes re-authentication request (RAR) and re-authentication answer (RAA) messages. However, the present subject matter is not limited to these particular messages. Any messaging suitable for instructing a policy and charging enforcement node to implement subscriber specific policies is intended to be within the scope of the subject matter described herein.

In the case where the subscribers whose QoS attributes are being enhanced are in different locations, such as at plural locations of the same retailer, network metadata directed policy server 100 may identify the PCRF associated with each subscriber, and each PCRF will signal the PCEF currently enforcing policy rules for each subscriber. Binding information that indicates which sessions are being handled by which PCRF may be stored in the HSS or in a separate subscriber binding repository (SBR). In either case, network metadata directed policy server 100 may query the HSS or SBR for the information. In an alternate implementation, network metadata directed policy server 100 may subscribe to each PCRF in its network and obtain binding information as new sessions are established. In yet another alternate implementation, network metadata directed policy server 100 may obtain the binding information from a Diameter signaling router (DSR) that stores and/or generates such binding information.

Figure 2:
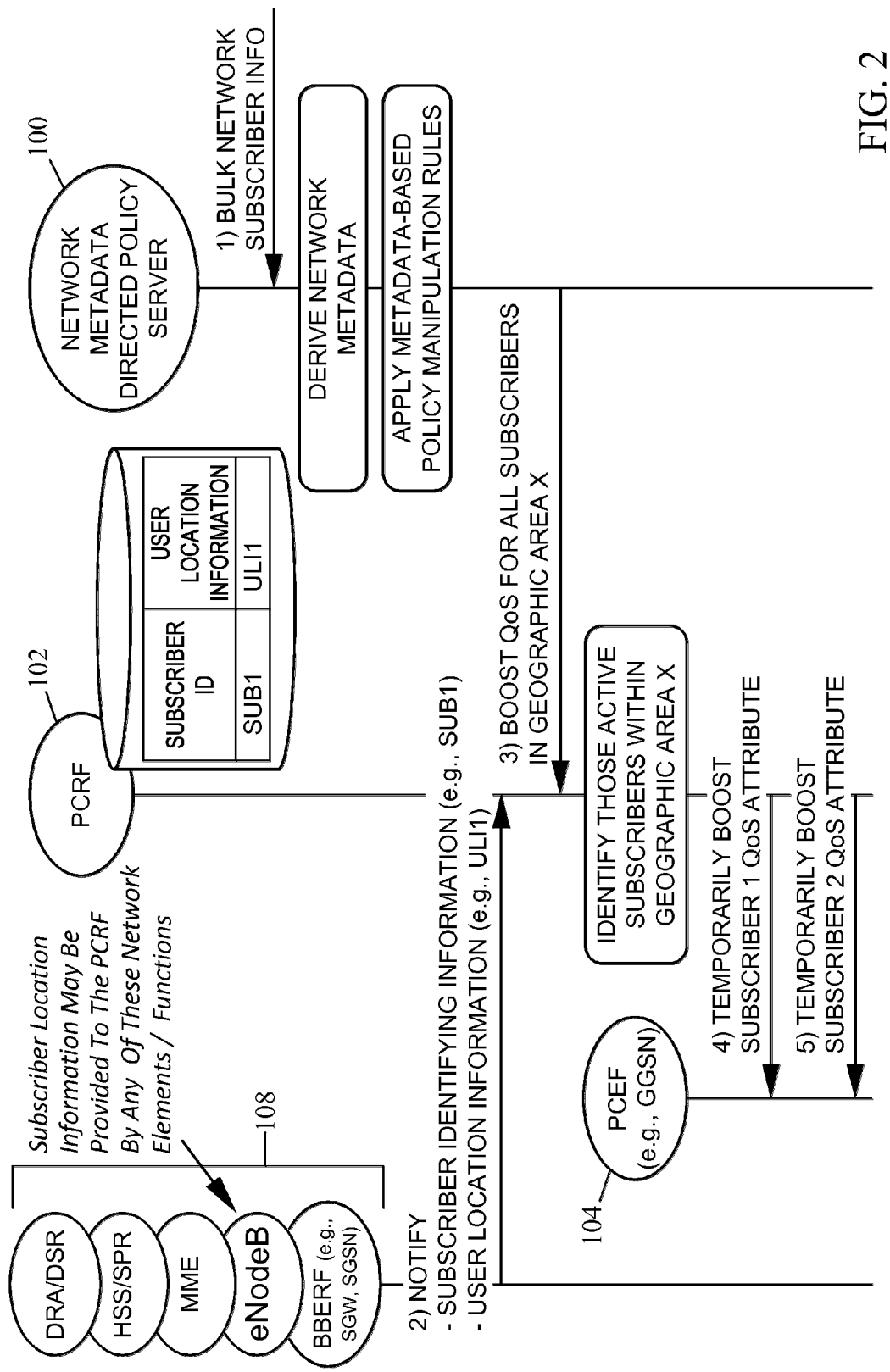
FIG. 2 is a message flow diagram illustrating exemplary messaging for implementing network metadata based policy control according to an alternate embodiment of the subject matter described herein.

FIG. 2 illustrates an alternate embodiment of the subject matter described herein. In FIG. 2, rather than having the network metadata directed policy server 100 send instructions for manipulating the operator controlled policies of individual subscribers, network metadata directed policy server 100 instructs PCRF 102 to boost the QoS for all of the network operator's subscribers within a particular geographic area. PCRF 102 then maps the geographic area to specific subscribers of the network operator that are currently active within that area and instructs PCEF 104 to implement the policies as described above.

Referring to the message flow illustrated in FIG. 2, in message 1, network metadata directed policy server 100 receives network location information regarding subscribers. As set forth above, the location information may come from network information sources 108, such as a location server, an HLR, an HSS, a presence server, or from mobile subscriber devices 106. In message 2, PCRF 102 is notified of subscriber's present geographic locations. Message 2 may be sent periodically by each PCEF or other node in contact with subscriber devices 106. Upon receiving the subscriber location information from network information sources 108, network metadata directed policy server 100 derives network metadata. The network metadata may be aggregate subscriber information that indicates the number of subscribers having the same characteristic, such as being located in the same location or locations of a retailer. Network metadata directed policy server 100 may determine whether the subscriber aggregation information indicates that a threshold for a particular organization is met. If the threshold is met, in message 3, network metadata directed policy server 100 sends a message to PCRF 102 to enhance the quality of service for all subscribers within the geographic area corresponding to the organization. PCRF 102 may identify active subscribers within the geographic area that are subscribers of the particular service provider that has an agreement with the business located in the geographic area. PCRF 102 may then send a message or messages to PCEF 104 to increase the quality of service attribute for the identified subscribers.

The instructions sent by network metadata directed policy server 100 to enhance the QoS parameter for a particular subscriber are distinct from the instructions sent over the Rx interface by an application function (AF) to request quality of service for a particular session. Such a request must be made within the subscriber's operator assigned policy control parameters. The instructions sent by network metadata directed policy server 100 may enhance a quality of service parameter, such as total download bandwidth to be shared across all services, from the operator assigned value to an enhanced value. The enhanced value may be outside the scope of the parameter values that an application function can request. In other words, an application function may not be capable of modifying an operator controlled policy parameter beyond operator controlled limits set for the subscriber. Likewise, an application function may be incapable of implementing an agreement between a network operator and a third party, such as retailer. However, the subject matter described herein is not limited to enhancing a quality of service parameter that is global across services that a subscriber may request. The operator controlled quality of service parameter that is manipulated may be the download bandwidth assigned to a currently active session so that the quality of service for a particular subscriber or group of subscribers immediately improves for in-progress sessions in response to receiving the manipulation command.

The time period during which the QoS parameter value is enhanced may be defined by a timer that expires or by start and stop messages sent by network metadata directed policy server 100. For example, network metadata directed policy server 100 may signal PCRF 102 at the initiation and termination of a policy enhancement period to define the term or time period during which QoS parameters are enhanced. Network metadata directed policy server 100 may internally monitor the QoS enhancement period and send the QoS enhancement termination signal to the PCRF at the end of the policy enhancement period. In an alternate implementation, network metadata directed policy server 100 may specify a duration in the initial instructions to enhance the QoS attribute, and PCRF 102 may only enhance the attribute for this duration. After the end of the QoS enhancement period, QoS parameter values for the subscribers may return to pre-enhancement levels. Either implementation is intended to be within the scope of the subject matter described herein.

Figure 3A:
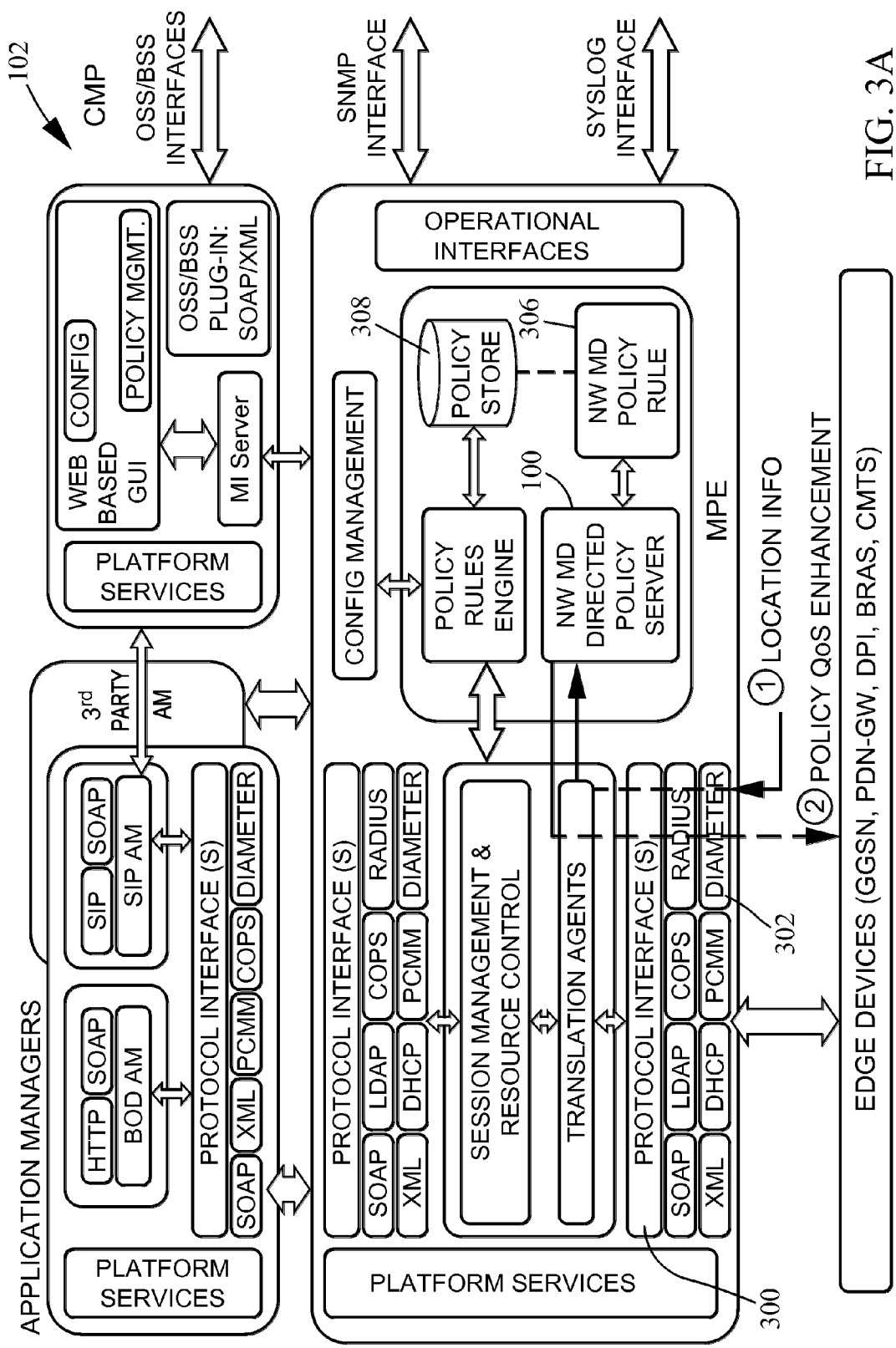
FIG. 3A is a block diagram illustrating a PCRF with an integrated network metadata directed policy server according to an embodiment of the subject matter described herein.

FIG. 3A is a block diagram illustrating an embodiment of the subject matter described herein in which network metadata directed policy server 100 is a component of PCRF 102. Referring to FIG. 3A, PCRF 102 includes protocol interfaces 300 that interface with external devices via various protocols. Of interest to the subject matter described herein is Diameter interface 302 through which PCRF 102 may receive subscriber location information from an HSS or other network device or node. Location information may be passed from protocol interfaces 300 to translation agent 304, which translate the location information into an internal format used by PCRF 102 and forwards the location information to network metadata directed policy server 100. Network metadata directed policy server 100 may access a network metadata policy rule 306 stored in policy store 308. Network metadata policy rule 306 may be any of the above-described rules that allow network metadata directed policy server 100 to derive network metadata from the subscriber location information and then determine whether the derived network metadata meets a threshold condition. If network metadata directed policy server 100 determines that the threshold condition is met, network metadata directed policy server 100 may cause PCRF 102 to send instructions to one or more PCEF nodes to enhance the quality of service of the identified subscribers.

Figure 3B:
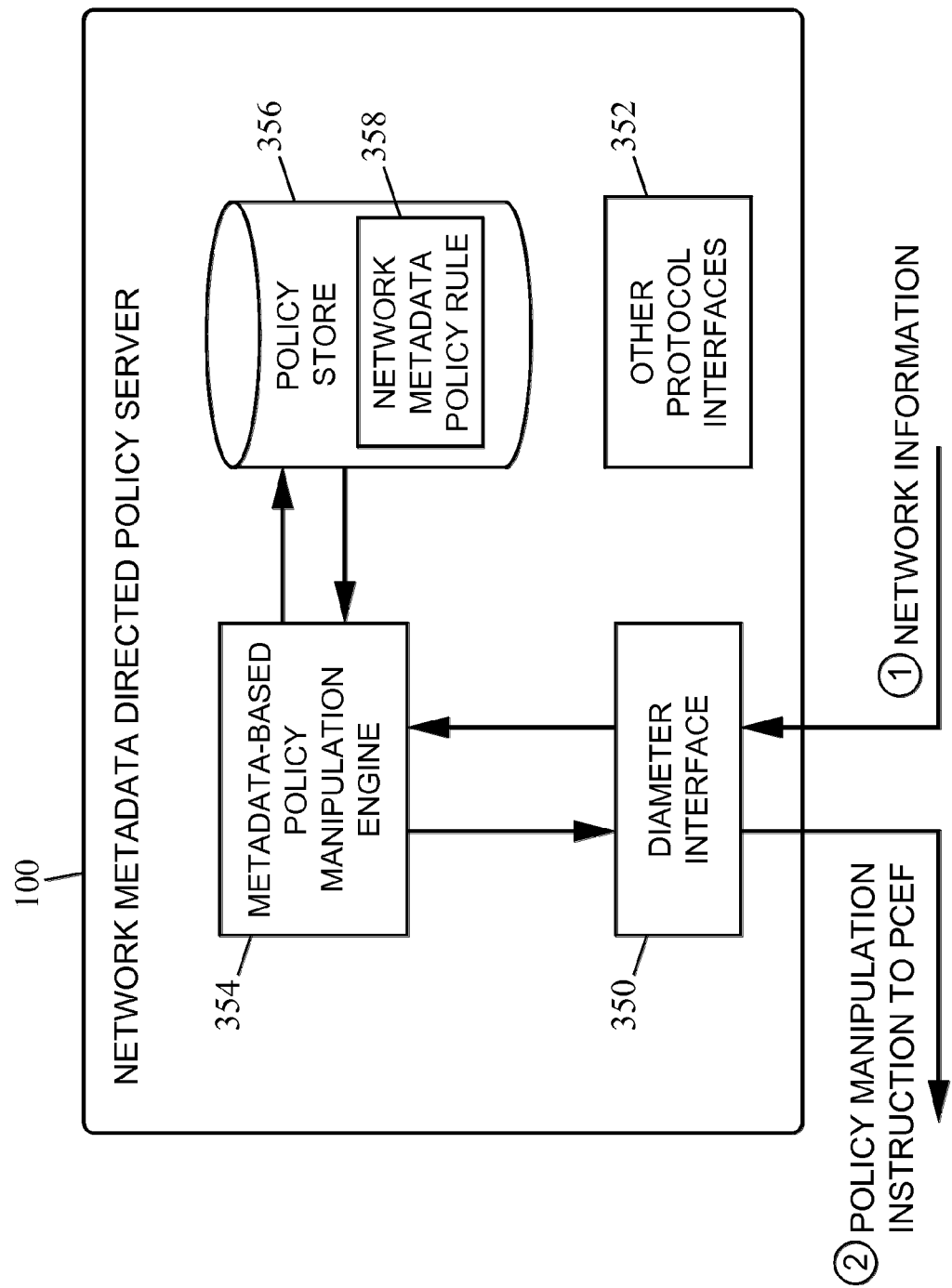
FIG. 3B is a block diagram illustrating a standalone network metadata directed policy server according to an embodiment of the subject matter described herein.

In the embodiment illustrated in FIG. 3A, network metadata directed policy server 100 is a component of PCRF 102. In an alternate embodiment, network metadata directed policy server 100 may be a standalone node that receives the network information network information sources 108 and instructs the PCEF to enhance the QoS for the identified subscribers without first sending the instruction to PCRF 102. FIG. 3B illustrates such an embodiment. In FIG. 3B, network metadata directed policy server 100 may include a Diameter interface 350 that sends and receives Diameter signaling messages. Network metadata directed policy server 100 may further include other protocol interfaces 352 for communicating via protocols other than Diameter. For example, the other protocol interfaces 352 may include a mobile application part (MAP) interface for receiving MAP messages containing subscriber information, a presence interface receiving presence messages containing subscriber information, and/or a session initiation protocol (SIP) interface for receiving subscriber information from mobile handsets. Network metadata directed policy server 100 may further includes a metadata based policy manipulation engine 354 and a policy store 356. Network metadata based policy manipulation engine 354 may derive network metadata from received network information, access policy store 356 to obtain a network metadata policy manipulation rule 358, apply the rule, and generate and send an instruction to the PCEF to enhance the QoS of identifier subscribers if the condition of the rule is satisfied.

Figure 4:
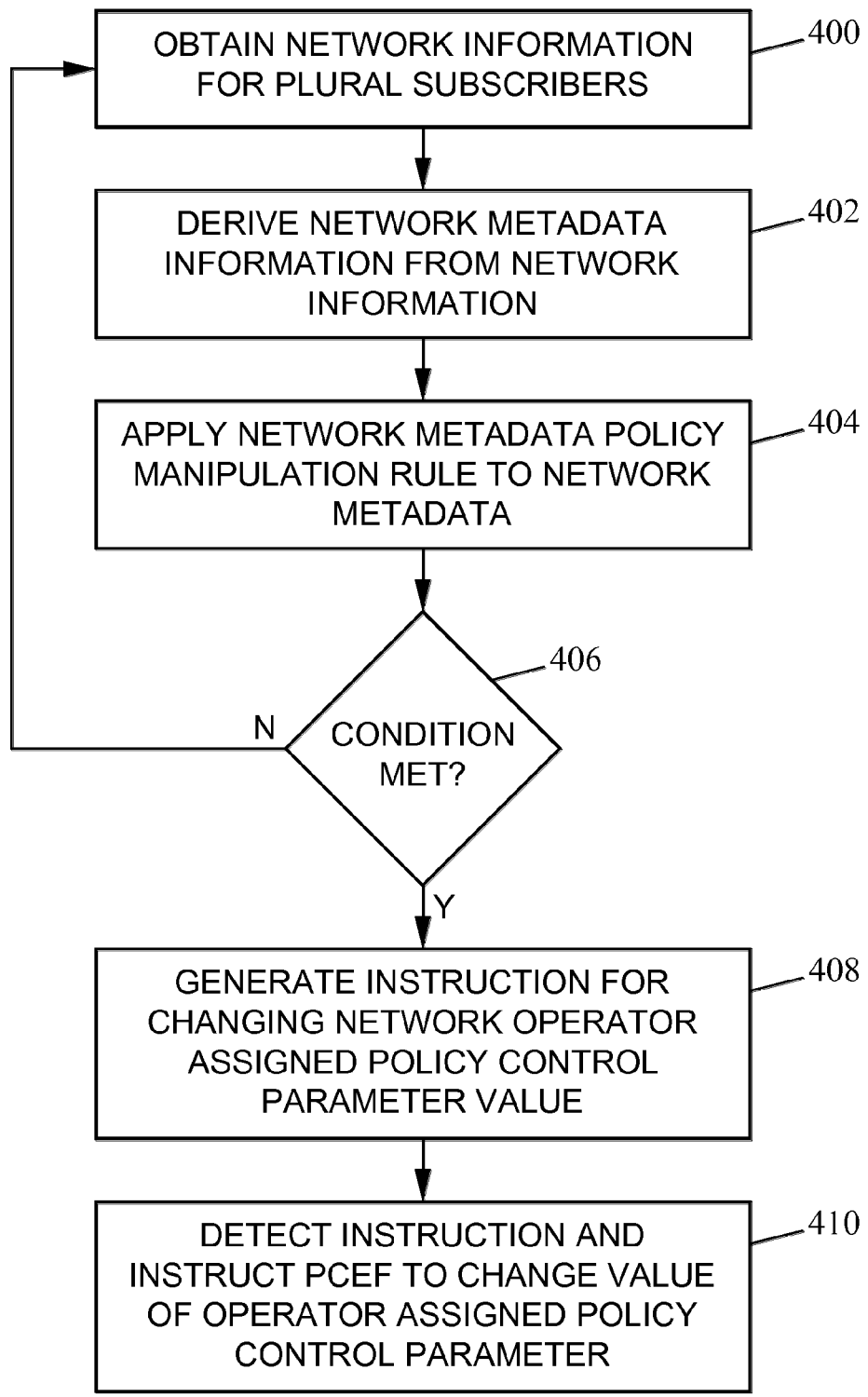
FIG. 4 is a flow chart illustrating exemplary steps for network metadata directed policy control according to an embodiment of the subject matter described herein.

FIG. 4 is a flow chart illustrating exemplary overall steps for network metadata directed policy control according to an embodiment of the subject matter described herein. Referring to FIG. 4, in step 400, network metadata directed policy server 100 obtains network information regarding a plurality of subscribers. For example, as illustrated in FIG. 3, network metadata directed policy server 100 may obtain subscriber location information from a location server, an HLR, an HSS, a presence server, and/or from mobile handsets. In step 402, network metadata directed policy server 100 derives network metadata from the network information. For example, as set forth above, network metadata directed policy server 100 may determine subscriber aggregation information that indicates the number of subscribers currently present in the business location of an entity.

In steps 404 and 406, network metadata directed policy server 100 applies a network metadata policy manipulation rule for changing a value of an operator assigned policy control parameter for the subscribers. If the condition of the rule is met, network metadata directed policy server 100 may determine that the QoS for subscribers within the business location should be increased temporarily. Accordingly, in step 408, network metadata directed policy server 100 generates an instruction for changing the network operator assigned policy control parameter for the subscribers. If the condition of the rule is not met, control returns to step 400 where network information is received and the process is repeated.

Returning to step 408, assuming that the condition is met, control proceeds to step 410, where PCRF 102 detects the instruction and instructs a PCEF to change the value of the operator assigned policy control parameter for the subscribers. For example, referring to FIG. 3, PCRF 102 may forward the instruction to the GGSN or other node that enforces the policies for the identified geographic areas.

Figure 5:
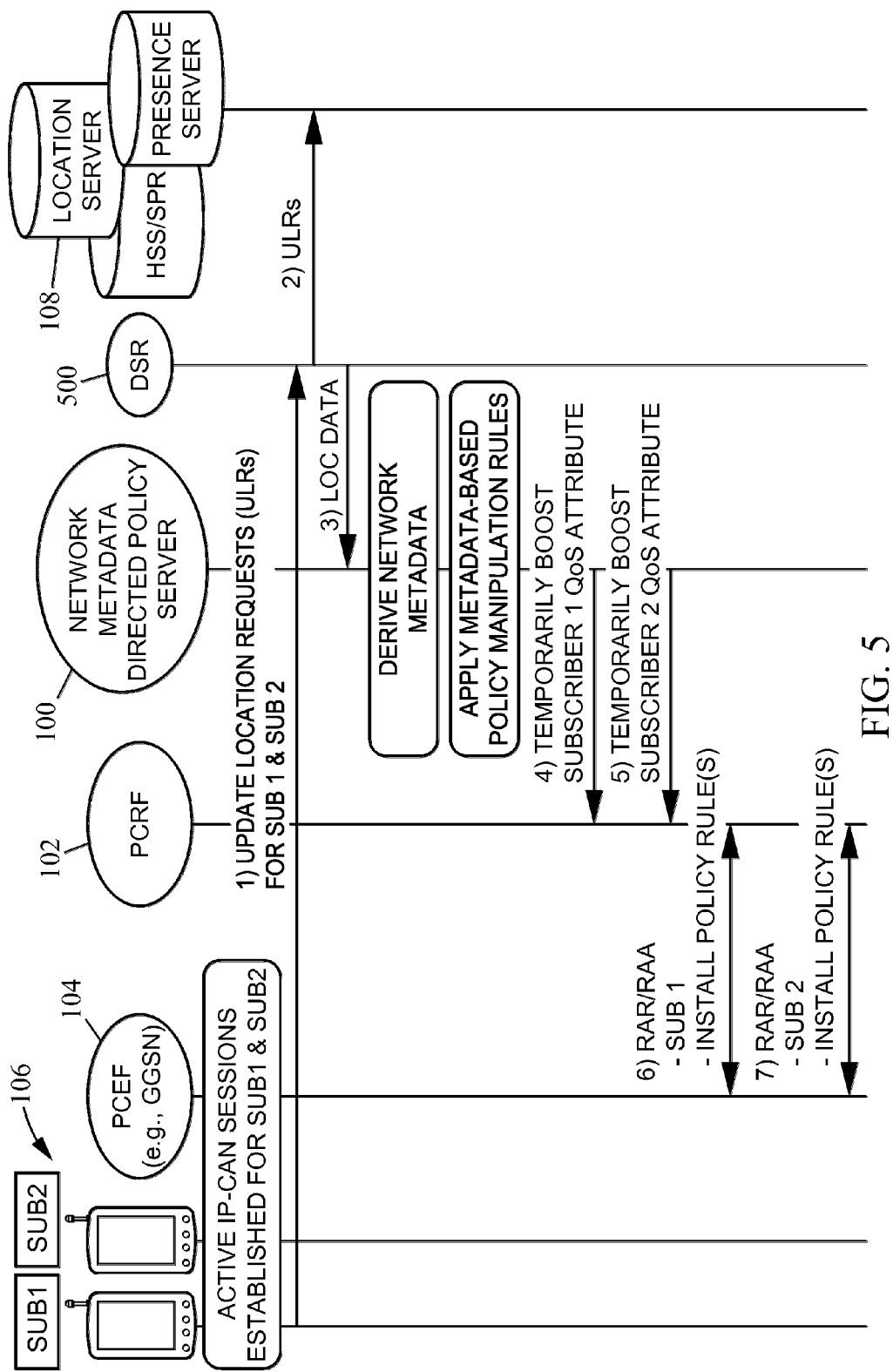
FIG. 5 is message flow diagram where a Diameter signaling router provides subscriber information to a network metadata directed policy server according to an embodiment of the subject matter described herein.

In the examples illustrated in FIGS. 1 and 2, network metadata directed policy server 100 receives policy information from network sources 108. In an alternate implementation, network information may be intercepted by an intermediate node, such as a Diameter signaling router (DSR), and provided by the DSR to network metadata directed policy server 100. FIG. 5 illustrates such an embodiment. In FIG. 5, subscriber devices 106 send update location request messages to network location nodes, such as an HSS. DSR 500 intercepts these messages, extracts location data, and forwards the location data to network metadata directed policy server 100. DSR 500 may route the original update location request messages to the HSS. The remaining operation in FIG. 5 is similar to that in FIG. 1 where network metadata is derived from the location information, a policy instruction is generated, and the instruction is sent to PCEF 104.

Providing network metadata based policy control allows network operators to enter agreements with retailers based on groups of subscribers visiting a retailer's location or locations. For example, if, as described above, a policy enhancement is triggered based on a group of subscribers being in a retailer's location or locations at the same time or within a predetermined time period of each other, the retailer's obligation to compensate the network operator may only be triggered when there is a substantial benefit to the retailer caused by the threshold number of subscribers visiting the retailer's location or locations. Providing policy enhancement incentives based on groups of subscribers, rather than individual subscribers, thus decreases the administrative cost of providing policy enhancement incentives by only triggering a retailer's compensation obligations when the threshold is met.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for network metadata based policy control, the system comprising:
   a policy store for storing at least one network metadata policy manipulation rule for triggering a change in a value of an operator assigned policy control parameter for subscribers; and
   a network metadata directed policy server for obtaining network information for a plurality of subscribers, for deriving network metadata from the network information, wherein the network metadata includes a number of a service provider's subscribers that are present in a single retailer location or across plural retailer locations, for accessing the policy store and applying one of the network metadata policy manipulation rules for changing a value of an operator assigned policy control parameter for the subscribers, for determining whether a threshold condition specified by the applied network metadata policy manipulation rule is satisfied, and for generating an instruction to automatically trigger the change in the value of the network operator assigned policy control parameter for currently active sessions of an identified group of a plurality of subscribers determined to be present in the single retailer location or across plural retailer locations to a new value in response to determining that the threshold condition is satisfied.

2. The system of claim 1 comprising a policy and charging rules function (PCRF) node for detecting the instruction and for instructing a policy and charging enforcement function (PCEF) node to change the value of the operator assigned policy control parameter for the identified group of subscribers.

3. The system of claim 1 wherein the network metadata directed policy server is configured to instruct a policy and charging enforcement function (PCEF) node to change the value of the operator assigned policy control parameter for the identified group of subscribers.

4. The system of claim 1 wherein the network information identifies geographic locations of a service provider's subscribers.

5. The system of claim 1 wherein the network metadata policy manipulation rule is based on an agreement between a wireless network operator and a retailer.

6. The system of claim 1 wherein the instruction identifies individual subscribers within the group to which the network policy manipulation rule is to be applied.

7. The system of claim 2 wherein the instruction identifies a geographic area to which the network metadata policy manipulation rule is to be applied and wherein the PCRF node identifies individual subscribers within the group determined to be present in the geographic area to which the network metadata policy manipulation rule is to be applied.

8. The system of claim 1 wherein the network metadata policy manipulation rule identifies the group of subscribers at a plurality of different retailer locations whose download bandwidth is to be temporarily enhanced.

9. The system of claim 2 wherein the network metadata policy manipulation rule identifies a plurality of retailer locations where download bandwidth is to be temporarily enhanced and wherein the PCRF node is configured to identify individual subscribers within the group of subscribers determined to be present at the retailer locations whose download bandwidths are to be temporarily enhanced.

10. The system of claim 1 wherein the network operator assigned policy control parameter comprises a download bandwidth parameter.

11. The system of claim 1 wherein the network metadata directed policy server defines a time period during which the value of the network operator assigned policy control parameter will be changed.

12. The system of claim 2 wherein the network metadata directed policy server or the PCRF node generates an accounting record upon changing the value of the network operator assigned policy control parameter to the new value.

13. The system of claim 1 wherein the network metadata directed policy server is configured to obtain the network information from a home subscriber server, a location server, a presence server, or mobile handsets.

14. The system of claim 1 comprising a Diameter signaling router (DSR) configured to intercept update location messages regarding the subscribers and to provide corresponding subscriber information to the network metadata directed policy server.

15. The system of claim 1 comprising a policy and charging rules function (PCRF) node, wherein the network metadata directed policy server and the policy store are components of the PCRF node.

16. A method for network metadata based policy control, the method comprising:
  at a network metadata directed policy server:
    obtaining network information for a plurality of subscribers;
    deriving network metadata from the network information, wherein the network metadata includes a number of a service provider's subscribers that are present in a single retailer location or across plural retailer locations;
    applying a network metadata policy manipulation rule for triggering a change in a value of an operator assigned policy control parameter for the subscribers;
    determining whether a threshold condition specified by the applied network metadata policy manipulation rule is satisfied; and
    generating an instruction for automatically triggering the change in the value of the network operator assigned policy control parameter for currently active sessions of an identified group of a plurality of subscribers determined to be present in the single retailer location or across plural retail locations to a new value in response to determining that the threshold condition is satisfied.

17. The method of claim 16 comprising, at a policy and charging rules function (PCRF) node, detecting the instruction and instructing a policy and charging enforcement function (PCEF) node to change the value of the operator assigned policy control parameter for the identified group of subscribers.

18. The method of claim 16 comprising, at the network metadata directed policy server, instructing a policy and charging enforcement function (PCEF) node to change the value of the operator assigned policy control parameter for the identified group of subscribers.

19. The method of claim 16 wherein the network information identifies geographic locations of a service provider's subscribers.

20. The method of claim 16 wherein the network metadata policy manipulation rule is based on an agreement between a wireless network operator and a retailer.

21. The method of claim 16 wherein the instruction identifies individual subscribers within the group to which the network policy manipulation rule is to be applied.

22. The method of claim 17 wherein the instruction identifies a geographic area to which the network metadata policy manipulation rule is to be applied and wherein the PCRF node identifies individual subscribers within the group determined to be present in the geographic area to which the network metadata policy manipulation rule is to be applied.

23. The method of claim 16 wherein the network metadata policy manipulation rule identifies subscribers within the group of subscribers present at a plurality of different retailer locations whose download bandwidth is to be temporarily enhanced.

24. The method of claim 17 wherein the network metadata policy manipulation rule identifies a plurality of retailer locations where download bandwidth is to be temporarily enhance and wherein the PCRF node is configured to identify individual subscribers within the group of subscribers present at the retailer locations whose download bandwidths are to be temporarily enhanced.

25. The method of claim 16 wherein the network operator assigned policy control parameter comprises a download bandwidth parameter.

26. The method of claim 16 wherein the network metadata directed policy server defines a time period during which the value of the network operator assigned policy control parameter will be changed.

27. The method of claim 17 wherein the network metadata directed policy server or the PCRF node generates an accounting record upon changing the value of the network operator assigned policy control parameter to the new value.

28. The method of claim 16 wherein the network metadata directed policy server is configured to obtain the network information from a home subscriber server, a location server, a presence server, or from mobile handsets.

29. The method of claim 16 wherein the network metadata directed policy server is a component of a policy and charging rules function (PCRF) node.

30. A non-transitory computer readable medium having stored thereon executable instructions that when executed by the processor of a computer control the computer to perform steps comprising:
  at a network metadata directed policy server:
    obtaining network information for a plurality of subscribers;
    deriving network metadata from the network information, wherein the network metadata includes a number of a service provider's subscribers that are present in a single retailer location or across plural retailer locations;
    applying a network metadata policy manipulation rule for triggering a change in a value of an operator assigned policy control parameter for the subscribers;
    determining whether a threshold condition specified by the applied network metadata policy manipulation rule is satisfied; and
    generating an instruction for automatically triggering the change in the value of the network operator assigned policy control parameter for currently active sessions of an identified group of a plurality of subscribers determined to be present in the single retailer location or across plural retail locations to a new value in response to determining that the threshold condition is satisfied.

* * * * *